June 17, 1958 K. L. BERNINGER ET AL 2,839,070
GOVERNOR VALVE ASSEMBLY
Filed Nov. 12, 1952 2 Sheets-Sheet 1
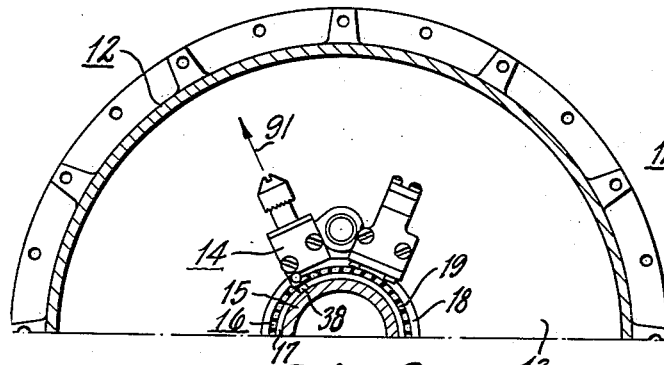
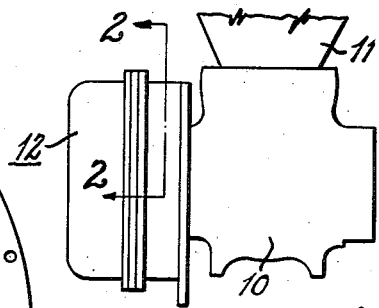
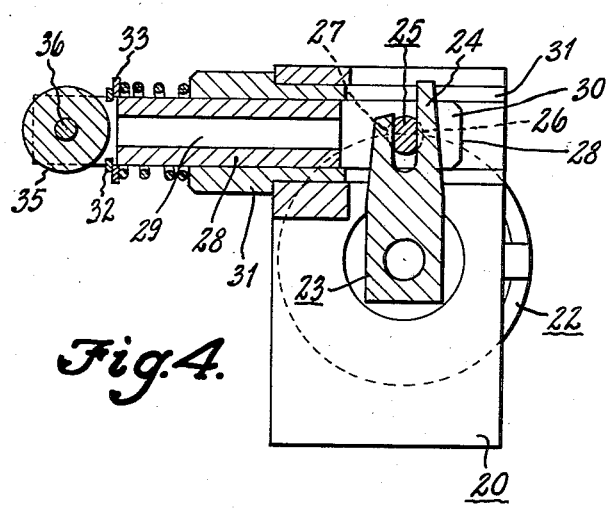
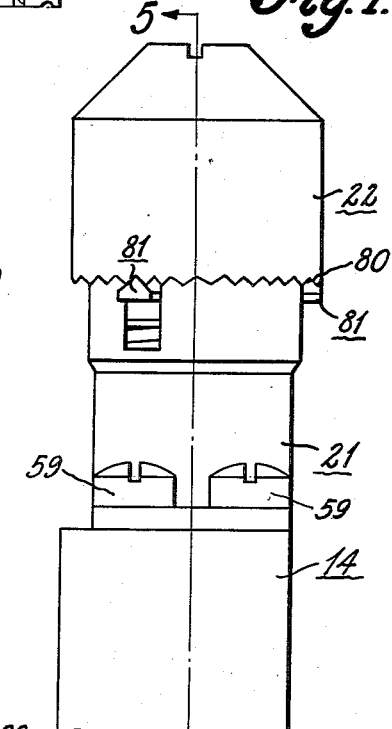
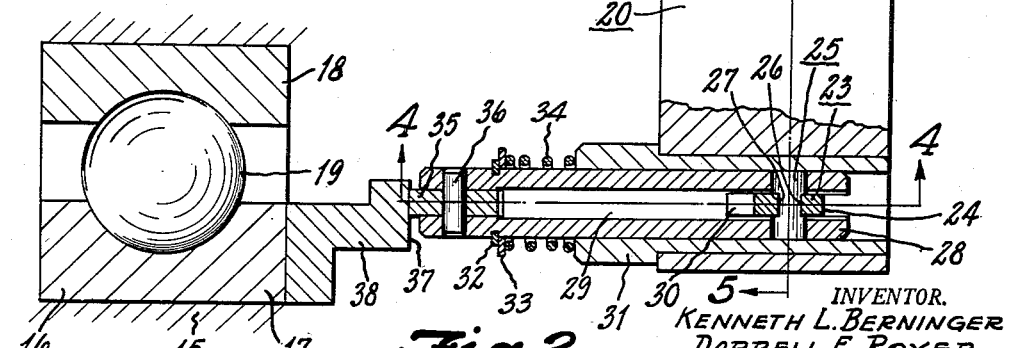
INVENTOR.
KENNETH L. BERNINGER
BY DARRELL E. ROYER
WILLIAM A. WEIS
Willits, Hardman and Feher
their ATTORNEYS June 17, 1958
K. L. BERNINGER ET AL
2,839,070
GOVERNOR VALVE ASSEMBLY
Filed Nov. 12, 1952
2 Sheets-Sheet 2
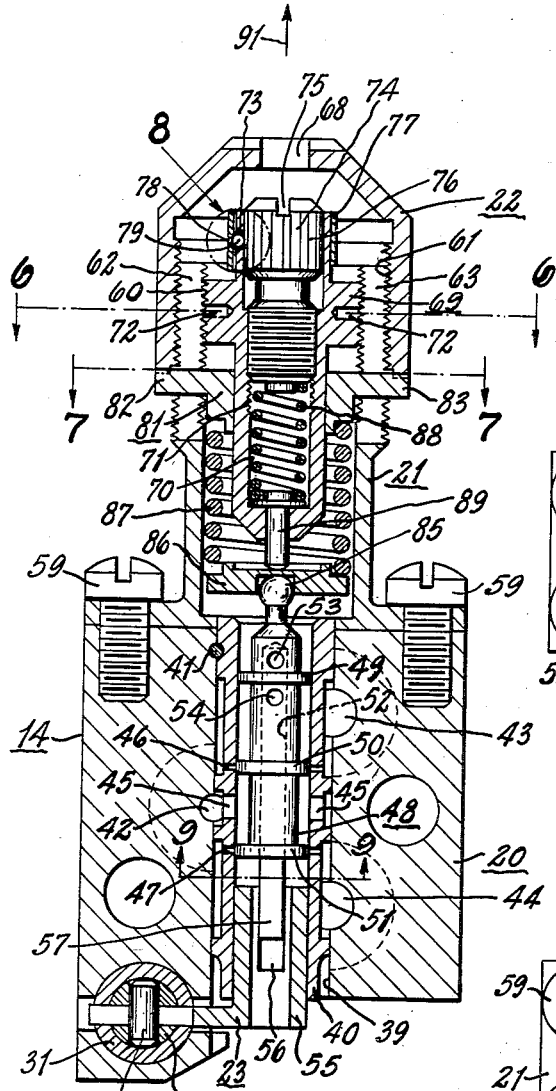
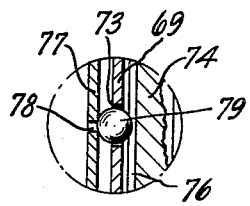
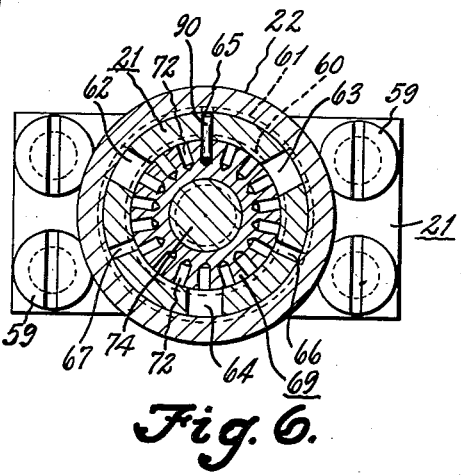
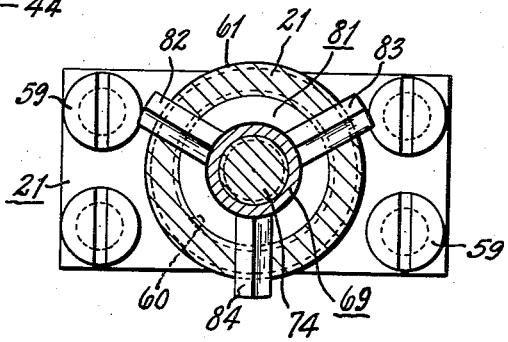
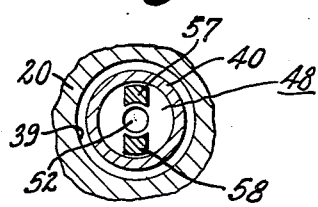
INVENTOR.
KENNETH L. BERNINGER
BY DARRELL E. ROYER
WILLIAM A. WEIS
their ATTORNEYS

United States Patent Office 2,839,070
Patented June 17, 1958

2,839,070

GOVERNOR VALVE ASSEMBLY

Kenneth L. Berninger, Dayton, Darrell E. Royer, Vandalia, and William A. Weis, Dayton, Ohio, assignors to General Motors Corporation, Detroit, Mich., a corporation of Delaware Application November 12, 1952, Serial No. 319,866

6 Claims. (Cl. 137—19)

The present invention pertains to valves, and particularly to centrifugally actuated valves adapted for use in speed governing apparatus.

Heretofore, governing apparatus of the type employing speed responsive valves for controlling the flow of fluid under pressure to servo-motors operatively connected to the speed controlling mechanism of a prime mover, has been extensively employed in constant speed variable pitch propellers. However, with the advent of electronic governors whereby greater precision in speed control can be obtained, the speed responsive governor valves have been relegated to use as standby governing means for establishing a range of precise speed control. A standby governing means also has the ancillary function of maintaining the speed within safe limits should a malfunction occur in the precise governor. Thus, the necessity for a centrifugally actuated underspeed-overspeed governor valve with its inherent ruggedness and reliability is readily apparent. Accordingly, among our objects are the provision of a centrifugally actuated overspeed-underspeed governor valve embodied as a unitary assembly, and the further provision of a valve having means constituting a deadband (a no-response range of movement) to thereby establish a range within which a precise governor will be solely effective.

The aforementioned and other objects are accomplished in the present invention by providing a valve assembly adapted for centrifugal actuation and having adjustable means for determining the deadband range. In the embodiment disclosed, the valve assembly embraces a valve body having a through bore within which a porting sleeve is rigidly retained. Concentrically mounted with respect to the porting sleeve is a piston assembly, which constitutes in essence a spool valve having spaced lands cooperable with the sleeve ports. The piston lands and sleeve ports are dimensionally designed and constructed to have an inherent deadband range wherein a predetermined relative movement between the piston and the sleeve will not cause a flow of fluid from the supply port to the control ports thereof. The piston is resiliently biased in a direction opposed to the direction in which centrifugal force acts when the valve assembly is mounted in a rotating structure. Thus, the piston functions as both a governor weight, which is speed responsive, and a valve element.

The force supplied by the resilient means for opposing centrifugal force may be adjusted to further vary the speed responsive characteristics of the valve assembly. The resilient means includes a pair of coaxially arranged springs, both of which are effective to oppose centrifugal force when the piston moves in one direction from its neutral position, but only one of which is effective to oppose centrifugal force when the piston moves in the opposite direction from its neutral position. The load imposed by the spring effective in both directions may be adjusted to vary the deadband in either the increase or decrease speed responsive range. The load imposed by the other spring may be adjusted to vary the deadband in only the increase speed responsive range. Further means are provided for retaining the various spring loads after initial adjustments have been made.

The piston also has associated therewith means for reducing the static friction opposing relative movement between the piston and the porting sleeve. These means comprise an oscillating jitter mechanism which is automatically operable when the valve assembly is mounted in a rotating structure.

Further objects and advantages of the present invention will be apparent from the following description, reference being had to the accompanying drawings wherein a preferred embodiment of the present invention is clearly shown.

In the drawings:

Figure 1 is a fragmentary view in elevation of a variable pitch propeller unit.

Figure 2 is an enlarged sectional view taken along line 2—2 of Fig. 1.

Figure 3 is an enlarged view, partly in section and partly in elevation, of the governor valve assembly of the present invention.

Figure 4 is a sectional view taken along line 4—4 of Fig. 3.

Figure 5 is a sectional view taken along line 5—5 of Fig. 3.

Figures 6, 7 and 9 are sectional views taken along lines 6—6, 7—7 and 9—9 of Fig. 5, respectively.

Figure 8 is an enlarged view taken within the circle 8 of Fig. 5.

With particular reference to Figs. 1 and 2, a variable pitch propeller unit is shown including a hub 10 having a plurality of radially extending sockets within each of which a propeller blade 11 is journaled for rotation about its longitudinal axis. The propeller hub 10 is operatively connected to the drive shaft of a prime mover, not shown, and constitutes an enclosure for fluid pressure operated servo-motor means, which are operatively connected to the propeller blades journaled therein to effect pitch change movements thereof. Rotatably attached to the aft end of the hub 10 is a rotating structure hereinafter called a regulator 12. The regulator 12 houses a fluid pressure circuit and valve mechanism for controlling the flow of fluid under pressure to and from the blade actuating servo-motors enclosed within the hub. The specific details of the fluid circuit form no part of the present invention except in that they constitute the environment with which the governor valve assembly of the present invention may be used. For example, the fluid pressure circuit may be of the type disclosed and claimed in co-pending application Serial No. 284,169, filed April 24, 1952, now Patent No. 2,754,922, in the name of Kenneth L. Berninger et al.

The regulator structure 12, as hereinbefore mentioned, rotates with the propeller hub 10. Within the regulator structure 12 is a partition member 13 upon which various and sundry control valves are mounted. As disclosed in Fig. 2, a governor valve assembly 14 constructed according to the present invention is mounted on the member 13 in such a manner that centrifugal force acts along its axial centerline. The regulator structure 12 is supported for rotation about a fixed hollow shaft 15 by bearing means 16. Bearing means 16 includes an inner race member 17 secured to the fixed shaft 15 in any suitable manner, an outer race 18 secured to the rotating regulator structure 12 in any suitable manner, and a plurality of ball bearings 19 interposed between the inner and outer race members 17 and 18.

With particular reference to Figs. 3 and 4, the governor valve assembly 14 includes a valve body 20, a spring housing 21, and an adjustment member 22. The specific details of the valve construction will be dealt with later, but for the present, it will suffice to say that within the valve body 20 are mounted a pair of relatively movable valve elements, namely, a porting sleeve and a valve piston. The valve piston is operatively connected by means to be described, to a crank arm 23 adjacent one end thereof. The other end of the crank arm 23 has a bifurcated end portion 24 between which a fulcrum pin 25 is positioned. The fulcrum pin 25 has a pair of diametrically opposed grooves 26 and 27 intermediate its ends. The slot provided by the bifurcated end portion 24 of the crank arm 23 fits intimately with the metal section disposed between the two grooves 26 and 27. Opposite end portions of the fulcrum pin 25 are disposed within aligned openings in a push rod 28 having a through bore 29, and a pair of longitudinally extending diametrically opposed slots 30 through which opposite ends of the crank arm 23 project. The push rod 28 is mounted for lineal movement relative to the valve body 20 within a sleeve 31 that is attached to the valve body.

Adjacent the free end of the push rod 28, an annular groove is formed in the external periphery thereof within which a snap ring 32 is positioned. The snap ring locates a washer member 33 forming a seat for one end of a coil spring 34 encompassing the push rod 28, the other end of the spring seating against the end of sleeve 31. A roller 35, constituting a cam follower, is also journaled by means of pin 36 adjacent the free end of the push rod 28, the free end of the push rod likewise being bifurcated to permit rotation of the roller 35. The roller 35 is adapted to engage a cam surface 37, the roller being maintained in engagement therewith by means of spring 34. The cam surface 37 is formed on a member 38, which is attached to the fixed ball bearing race 17. Accordingly, as the regulator structure 12 rotates about the fixed shaft 15, the cam follower 35 in following the surface undulations of the member 38 will transmit lineal movement to the push rod 28 relative to the valve body 20. Lineal movement of the push rod 28 will be converted by the crank arm 23 to oscillatory motion of the valve piston operatively connected thereto. The structure so far described constitutes the oscillating jitter means for reducing static friction between the relatively movable parts of the valve assembly.

Referring more particularly to Figs. 5 through 9, the structural details of the governor valve assembly will now be described. The valve body 20 has a through bore 39 within which a porting sleeve 40 is immovably retained by means of a pin 41. The porting sleeve 40 has a plurality of annular grooves separated by raised portions, the grooves communicating, respectively, with a supply passage 42 and control passages 43 and 44 of the valve body. Interconnecting the bore of the porting sleeve and the annular grooves are a plurality of circumferentially spaced ports 45, 46 and 47. The ports 45 communicate with the supply passage 42 and thereby constitute the supply ports of the valve assembly; the ports 46 communicate with the control passage 43 of the valve body thereby constituting one set of control ports; and the ports 47 likewise communicate with control passage 44 of the valve body constituting a second set of control ports. Within the bore of the porting sleeve 40 and mounted for movement relative thereto is a valve piston or plunger 48. The plunger 48 has a plurality of spaced lands 49, 50 and 51, and a longitudinally extending recess 52. The widths of lands 50 and 51 which cooperate, respectively, with control ports 46 and 47 of the porting sleeve are of greater width than these ports, thereby constituting a physical deadband or no response region within which relative movement between the plunger 48 and the porting sleeve 40 will not effect flow of fluid under pressure from the supply port 45 to either of the control ports.

The closed end of the axially extending recess 52 connects with a pair of transversely extending openings 53 and 54, disposed, respectively, on opposite sides of the land 49. The purpose of opening 53 is to allow any fluid which may seep past the co-engaging surfaces of the land 49 and the porting sleeve 40 into the spring housing 21, to drain through passage 52 and out the open end of the porting sleeve adjacent the crank arm 23. The purpose of opening 54 is to allow fluid to drain from control passage 43 of the valve body through the passage 52 of the plunger and out the open end of the porting sleeve 40. When control passage 44 is connected to drain, the fluid can flow directly out the open end of the porting sleeve 40. It is to be understood that drain flow from the open end of the porting sleeve 40 returns to a reservoir formed within the rotating regulator structure 12, aforementioned.

The operative connection between the crank arm 23 and the plunger 48 whereby oscillating jitter is supplied to the plunger 48 upon lineal movement of the push rod 28 will now be described. This operative connection includes a hollow tubular portion 55 of the crank arm, which extends into the open end of the porting sleeve 40. The tubular portion 55 is, of course, journaled for rotation within the porting sleeve 40 and has adjacent its upper end a pair of diametrically opposed slots, one of which, 56, is shown in Fig. 5. The plunger assembly 48 has a bifurcated end portion presenting tangs 57 and 58, which are received within the slotted end portion of the crank arm 23, as is shown in Figs. 5 and 9. In this manner, it is readily apparent that any oscillation transmitted to crank arm 23 will be transmitted to the valve plunger 48 thereby reducing the static friction between the relatively movable plunger and porting sleeve. It is further to be understood that the oscillating jitter is automatically operable at any time when the regulator structure 12, aforementioned, is rotating.

The spring housing 21 is attached to the valve body by any suitable means, such as threaded devices 59. The housing 21 presents interior and exterior threaded portions 60 and 61, respectively, adjacent the free end thereof. As is seen in Figs. 5 and 6, the housing 21 is provided with three longitudinally extending slots 62, 63 and 64 disposed substantially 120° apart. The purpose of these slots will later be described. The housing 21 is further provided with three smaller longitudinally extending slots 65, 66 and 67 likewise disposed substantially 120° apart and displaced midway between the slots 62 and 64 heretofore described. The purpose of these openings will likewise later be described. The internally threaded adjustment member 22 engages threads 61 of the housing 21. The member 22 has a central opening 68, the function of which will later be apparent. Disposed within the housing 21 and engaging the threads 60 thereof is a cartridge member 69 having a stepped through bore 70. A portion of the larger diameter part of the stepped bore 70 is internally threaded at 71. The portion of the cartridge 69 which engages the thread 60 of the housing 21 is provided with a plurality of circumferentially spaced circular recesses 72, the function of which will later be described. The end of the cartridge member 69 adjacent the larger diameter portion of the through bore 70 has a single circular opening 73 therethrough. Engaging the threaded portion 71 of the cartridge member 69 is a threaded member 74 having a notch 75 for adjusting its position within the cartridge 69 and a serrated head portion 76 disposed in alignment with the opening 73 in the cartridge. Encompassing the cartridge 69 is a sleeve spring 77, likewise having a single circular opening 78 therein in alignment with the opening 73 of the cartridge. Disposed within the opening 73 of the cartridge and engaging, respectively, the serrated head portion 76 and the opening 78 is a spherical member 79, which constitutes a detent.

As is seen in Fig. 3, the open end portion of the adjustment member 22 is provided with serrations 80, a plate member 81 having a central opening encompassing the external periphery of the cartridge 69, has three radially extending tang members 82, 83 and 84, the cross-section of which is a five-sided polygon having a pointed edge cooperable with the serrations 80 on the member 22. The radially extending tang portions 82, 83 and 84 extend through the slots 62, 63 and 64, respectively, in the spring housing 21. Thus, the plate member 81 likewise constitutes a detent.

One end of the plunger 48 has a spherical head portion 85 seated within a recess in a platform member 86. Disposed within the housing 21 and having its opposite ends engaging the platform 86 and the plate member 81 is a compression spring 87. Disposed within the larger diameter portion of the stepped bore 70 in the cartridge 69 is a second and weaker compression spring 88, the ends of which engage the member 74 and a plunger 89 extending through the smaller diameter portion of the stepped bore 70 and adapted for engagement with the platform 86. A pin 90 is utilized to lock the housing 21 and the cartridge 69 against relative movement after initial adjustment of the position of the cartridge 69 with respect to the housing 21.

As is readily apparent, the member 22 can be rotated to adjust the relative position between the member 22 and the spring housing 21. Rotation of the member 22 relative to the housing 21 will alter the load imposed by spring 87 acting on valve plunger 48 through the platform 86. When the adjustment of member 22 is completed, the detent means formed by the radially extending tangs on plate member 81 will engage the serrations 80 on the member 22 whereby the adjustment cannot be altered by vibration. It is likewise readily apparent that by turning member 74 through the opening 68 provided in the member 22, the load of spring 88 upon the plunger 89 and the platform 86 may be varied, and the detent means constituted by the ball 79, the sleeve spring 77, and the serration 76 will likewise prevent a change in this adjustment due to vibration.

The operation of the governor valve assembly is as follows, it being understood that the plunger 48 serves a dual purpose. That is, the valve plunger 48 constitutes the governor weight responsive to speed as evidenced by the thrust of centrifugal force imposed thereon due to its orientation within the rotating structure 12; as well as performing the functions of a valve in controlling the flow of fluid to and from the control passages in the valve housing. The valve plunger 48 is shown in the neutral or on-speed position in Fig. 5. That is, with the several parts disposed in the relationship shown in Fig. 5, the thrust of centrifugal force in the direction of arrow 91 is equivalent to a load imposed by the springs 87 and 88 acting in opposition thereto. If a slight overspeed condition should occur in which instance a centrifugal force will exceed the load of the springs 87 and 88, the plunger 48 will tend to move relative to the sleeve 40 in an upward direction, as viewed in Fig. 5. Conversely, if a slight underspeed condition should exist in the rotating structure 12, the load imposed by spring 87 alone will exceed the thrust of centrifugal force and the valve plunger 48 will move downwardly relative to the sleeve 40, as viewed in Fig. 5.

However, slight underspeeds or overspeeds of the regulator 12 and its associated propeller will not effect a sufficient movement of the valve plunger to cause a flow of fluid from the supply port 42 of the valve body to one or the other of the control ports thereof. The reason for this is due to the physical deadband incorporated in the valve assembly by reason of the plunger lands 50 and 51 being of greater width than the control ports 46 and 47. Within this deadband or non-responsive range of centrifugally actuated governor operation, the precise governor is utilized to control the speed of propeller rotation. However, if the speed should vary more than a predetermined amount, as determined by the load adjustments on springs 87 and 88 coupled with the physical deadband of the valve assembly, the governor valve assembly will serve as a control valve and distribute fluid under pressure from the supply port to one or the other control ports whereby the speed of propeller operation will always be maintained within safe limits. These functions of the governor valve assembly are more thoroughly disclosed in the aforementioned application, Serial No. 284,169.

As is apparent from reference to Fig. 5, should the plunger 48 move downwardly from its neutral position, as is shown in this figure, the spring 88 will no longer impose a load in opposition to centrifugal force. However, should the valve plunger 48 move upwardly from the position shown in Fig. 5, both springs 87 and 88 will oppose the thrust of centrifugal force. Thus, it is readily apparent that by adjusting the load on spring 88 through relative movement between the member 74 and the cartridge 69, the increment of deadband in the overspeed range can be adjusted without effecting the increment of deadband in the underspeed range. This result follows logically by reason of the fact that the spring 88 only opposes centrifugal force when the valve plunger moves upwardly from its neutral position in response to an overspeed condition.

However, by adjusting the member 22, the load imposed by spring 87 is varied and as the spring 87 is effective to oppose centrifugal force in both the underspeed and overspeed ranges, the increment of deadband in both the overspeed and underspeed ranges may be altered by adjustment of the member 22. The relative position in which members 69 and 21 are locked by means of the pin 90, determines the range of load adjustment of spring 87 which can be effected by rotation of the member 74.

From the foregoing it is readily apparent that the present invention provides a unique governor valve assembly having a physical deadband incorporated therein, as well as an adjustable deadband constituted by the variable loading of the coaxially disposed springs. By this construction, the governor valve assembly is rendered extremely versatile in that a plurality of different deadband ranges may be selected through proper adjustments. It is to be understood that while the governor valve assembly is exemplified in conjunction with a variable pitch propeller control system, this is only by way of example and not by way of limitation.

While the embodiment of the present invention as herein disclosed, constitutes a preferred form, it is to be understood that other forms might be adopted.

What is claimed is as follows:

1. The combination with a rotating structure having a valve body attached thereto with a through bore so orientated that the direction of centrifugal force is in alignment with the axis of said bore, a valve element disposed within said bore and being of such mass as to constitute a weight member movable in response to centrifugal force, and resilient means engageable with said valve element for opposing movement between said valve body and valve element under the influence of centrifugal force, of means operable to effect relative alternate rotary movement in opposite directions between said valve element and valve body about their axes comprising, a stationary cam member about which said structure rotates, and means interconnecting the cam member and said valve element for imparting alternate rotary movement to said valve element during rotation of said structure so as to reduce the static friction opposing relative longitudinal movement between said valve element and said valve body.

2. The combination with a rotating structure having a valve body attached thereto with a through bore so orientated that the direction of centrifugal force is in alignment with the axis of said bore, a valve element disposed within said bore and being of such mass as to constitute a weight member movable in response to centrifugal force, and resilient means engageable with said valve element for opposing movement between said valve body and valve element under the influence of centrifugal force, of means operable to effect relative alternate rotary movement in opposite directions between said valve element and valve body about their axes comprising, a cam member having undulated surface, a cam follower resiliently maintained in engagement with said undulated surface, a crank arm attached to said valve element, and means interconnecting the cam follower and the crank arm for imparting alternate rotary movement to said valve element during rotation of said structure so as to reduce the static friction opposing relative longitudinal movement between said valve element and said valve body.

3. In a governor valve assembly, the combination including, a valve body having a through bore, a centrifugally responsive valve element movable longitudinally along said bore, resilient means for opposing movement of said valve element away from a neutral position by centrifugal force, and means operatively connected with said valve element and independent of longitudinal movement thereof for alternately rotating said valve element in opposite directions about its axis to reduce the static friction to relative longitudinal movement between the valve element and the valve body.

4. In a governor valve assembly, the combination including, a valve body having a through bore, a porting sleeve disposed within said bore, a centrifugally responsive valve element disposed within said sleeve and movable longitudinally therein, resilient means for opposing relative longitudinal movement between said valve element and said sleeve by centrifugal force, and means operatively connected with said valve element and independent of longitudinal movement thereof for effecting alternate rotary movement in opposite directions between said valve element and said sleeve about their axes to reduce the static friction opposing relative longitudinal movement between said valve element and said sleeve.

5. In combination with a rotating structure, a valve body attached to said rotating structure and having a through bore so oriented that the direction of centrifugal force is in alignment with the axis of said through bore, a valve element within said through bore of such mass as to constitute a weight member movable in response to said centrifugal force, means for opposing relative movement between said valve and said valve element under the influence of centrifugal force, means constituting a nonresponsive range of relative movement between said valve element and said valve body, and means operatively connected with said valve element and independent of longitudinal movement thereof for effecting relative alternate rotary movement in opposite directions between said valve element and said valve body about their axes for reducing the static friction between said valve element and said valve body.

6. In combination with a rotating structure, a valve body attached to said rotating structure and having a through bore so oriented that the direction of centrifugal force is in alignment with the axis of said through bore, a valve element within said through bore of such a mass as to constitute a weight member responsive to said centrifugal force, means for opposing relative longitudinal movement between said valve body and said valve element under the influence of centrifugal force, means constituting a nonresponsive range of relative movement between said valve element and said valve body, means for varying the nonresponsive characteristics of said valve assembly, and means operatively connected with said valve element and independent of longitudinal movement thereof for effecting relative alternate rotary movement in opposite directions between said valve element and said valve body about their axes for reducing the static friction opposing relative longitudinal movement between said valve element and said valve body.

References Cited in the file of this patent

UNITED STATES PATENTS

| | | |
|---|---|---|
| 1,500,686 | Sullivan | July 8, 1924 |
| 1,735,718 | Attendu | Nov. 12, 1929 |
| 1,908,396 | Albright | May 9, 1933 |
| 1,917,316 | Naab | July 11, 1933 |
| 2,139,194 | Lichtenstein | Dec. 6, 1938 |
| 2,509,104 | May | May 23, 1950 |
| 2,512,803 | MacNeil et al. | June 27, 1950 |
| 2,656,174 | Crookston | Oct. 20, 1953 |